United States Patent
Doi et al.

(10) Patent No.: US 7,203,441 B2
(45) Date of Patent: Apr. 10, 2007

(54) IMAGE FORMING APPARATUS AND METHOD FOR CONTROLLING THE PRE-ROTATION OF A REFLECTING MEMBER

(75) Inventors: Takahiro Doi, Toyokawa (JP); Masazumi Ito, Toyohashi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 303 days.

(21) Appl. No.: 10/834,253

(22) Filed: Apr. 29, 2004

(65) Prior Publication Data

US 2004/0227809 A1   Nov. 18, 2004

(30) Foreign Application Priority Data

May 16, 2003   (JP)   ............... 2003-139408

(51) Int. Cl.
G03G 15/00   (2006.01)
B41J 27/00   (2006.01)

(52) U.S. Cl. ........................... 399/75; 347/260

(58) Field of Classification Search ............... 347/260, 347/118; 399/75, 228, 43; 358/468, 488
See application file for complete search history.

(56) References Cited

U.S. PATENT DOCUMENTS

| | | | |
|---|---|---|---|
| 5,532,812 A | * | 7/1996 | Choi et al. .................. 399/228 |
| 5,883,659 A | * | 3/1999 | Serizawa et al. ........... 347/260 |
| 5,917,616 A | * | 6/1999 | Chou et al. .................. 358/488 |
| 6,204,867 B1 | * | 3/2001 | Fujimoto et al. ........... 347/118 |
| 2001/0015827 A1 | * | 8/2001 | Ishiyama ..................... 358/468 |
| 2001/0035983 A1 | * | 11/2001 | Abe ............................ 358/468 |
| 2004/0175199 A1 | * | 9/2004 | Yoshizawa .................... 399/75 |

FOREIGN PATENT DOCUMENTS

| | | |
|---|---|---|
| JP | 7-273951 | 10/1995 |
| JP | 9-251228 | 9/1997 |

* cited by examiner

Primary Examiner—Hai Pham
Assistant Examiner—Carlos Martinez, Jr.
(74) Attorney, Agent, or Firm—Morrison & Foerster LLP

(57) ABSTRACT

An image forming apparatus includes an input portion to input data, an image forming portion to form a latent image on an image carrying member by irradiating a laser beam onto a reflecting member rotatably driven by a motor and irradiating light reflected by the reflecting member onto the image carrying member, and to enable a pre-rotation of the reflecting member by driving the motor prior to irradiation of the laser beam, and a control portion to cause a pre-rotation of the reflecting member when a first function using the image forming portion for the data inputted from the input portion is selected, and to prohibit the pre-rotation of the reflecting member when a second function to store the data inputted from the input portion in a storing medium or to transmit the data to an external terminal apparatus without using the image forming portion is selected.

11 Claims, 6 Drawing Sheets

IMAGE FORMING APPARATUS AND METHOD FOR CONTROLLING THE PRE-ROTATION OF A REFLECTING MEMBER

This application claims priority under 35 U.S.C. § 119 to Japanese Patent Application No. P2003-139408 filed on May 16, 2003, the entire disclosure of which is incorporated herein by reference in its entirety.

BACKGROUND OF THE INVENTION

1. Field of the Invention

The present invention relates to an image forming apparatus and an image forming method that can be applied to MFPs (Multi Function Peripherals) having several functions, such as a copy function, a scan function, a facsimile (hereinafter referred to as "FAX") function and a print function, and perform an image forming (hereinafter may also referred to as "printing") operation by exposing a photoreceptor based on data inputted via an input portion.

2. Description of Related Art

The following description sets forth the inventor's knowledge of related art and problems therein and should not be construed as an admission of knowledge in the prior art.

Generally speaking, this kind of image forming apparatus, such as a MFP, is provided with an image forming portion for printing image data read by an image reading portion from a document placed on a document placing portion or printing print data sent from an external computer.

In the image forming portion, a reflecting member constituted by a polyangular mirror such as a polygon mirror or a galvanometer mirror is rotatably driven by a motor, and a laser beam modulated in response to data to be printed is reflected by the reflecting member toward a photoreceptor as an image carrying member, thereby forming an electrostatic latent image on the photoreceptor.

In such image forming portion, in general, the reflecting member normally is in a non-rotating state, and starts to rotate upon a print instruction caused by an operation of a copy start button for activating a motor. In this case, however, the print operation cannot be executed until the motor reaches the steady rotating status, resulting in a long first print time which is a time period required to initiate the first print operation from the operation of the copy start button.

In order to shorten the first print time, it is conventionally known to equip a pre-rotation function of activating the driving motor of the reflecting member when the opening/closing operation of the document cover is made or a document is disposed on the document placing portion prior to the operation of the copy start button (e.g., see Japanese Unexamined Laid-open Patent Publication No. H09-251228).

Another technique has also been proposed. In this technique, the reflecting member is shifted from a low speed rotating state to a high speed rotating state upon an operation of inputting a copy mode or a completion of setting a document onto the document placing portion (e.g., see Japanese Unexamined Laid-open Patent Publication No. H07-273951).

In the aforementioned conventional publicly known techniques, however, there is a drawback that the opening/closing operation of the document cover or the setting operation of the document onto the document placing portion causes the reflecting member to be shifted from the non-rotating state to a pre-rotating state even if the required operation is a non-image-forming operation not requiring the image forming portion to perform an image forming operation, e.g., an operation using a FAX transmission function of transmitting image data read by the image reading portion to an external terminal apparatus, an internet FAX transmission function of transmitting image data read by the image reading portion to a server as an attachment of an email, or a scan function of storing read image data into a storing medium such as a hard disk. This results in a useless rotation of the reflecting member to shorten the life of the reflecting member.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide an image forming apparatus capable of shortening a processing time for forming an image from data in an image forming portion while extending a life of a reflecting member by prohibiting a pre-rotation of the reflecting member when the image forming portion is in a non-use state.

Among other potential advantages, some embodiments can provide an image forming method capable of shortening a processing time for forming an image from data in an image forming portion while extending a life of a reflecting member by prohibiting a pre-rotation of the reflecting member when the image forming portion is not to be used.

According to a first aspect of a preferred embodiment of the present invention, an image forming apparatus, includes:

an input portion which inputs data;

an image forming portion capable of forming a latent image on an image carrying member by irradiating a laser beam corresponding to the data inputted via the input portion onto a reflecting member rotatably driven by a motor and irradiating light reflected by the reflecting member onto the image carrying member, and also capable of enabling a pre-rotation of the reflecting member by driving the motor prior to irradiation of the laser beam; and a control portion which causes a pre-rotation of the reflecting member when a first function of using the image forming portion for the data inputted from the input portion is selected, and prohibits the pre-rotation of the reflecting member when a second function of storing the data inputted from the input portion in a storing medium or transmitting the data to an external terminal apparatus without using the image forming portion is selected.

According to a second aspect of a preferred embodiment of the present invention, an image forming method to be executed by an image forming apparatus including an input portion which inputs data, and an image forming portion capable of forming a latent image on an image carrying member by irradiating a laser beam corresponding to the data inputted via the input portion onto a reflecting member rotatably driven by a motor and irradiating light reflected by the reflecting member onto the image carrying member, and also capable of enabling a pre-rotation of the reflecting member by driving the motor prior to irradiation of the laser beam, the method, includes the steps of:

an input step of inputting the data via the input portion; and a control step of causing a pre-rotation of the reflecting member prior to forming the latent image by irradiating light reflected by the reflecting member when a first function of forming the latent image by irradiating the laser beam corresponding to the data inputted from the input portion onto the reflecting member rotatably driven by the motor and irradiating light reflected by the reflecting member onto the image carrying member is selected, and prohibiting the pre-rotation of the reflecting member when a second function of storing the data inputted from the input portion in a storing medium or transmitting the data to an external terminal apparatus without using the image forming portion is selected.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
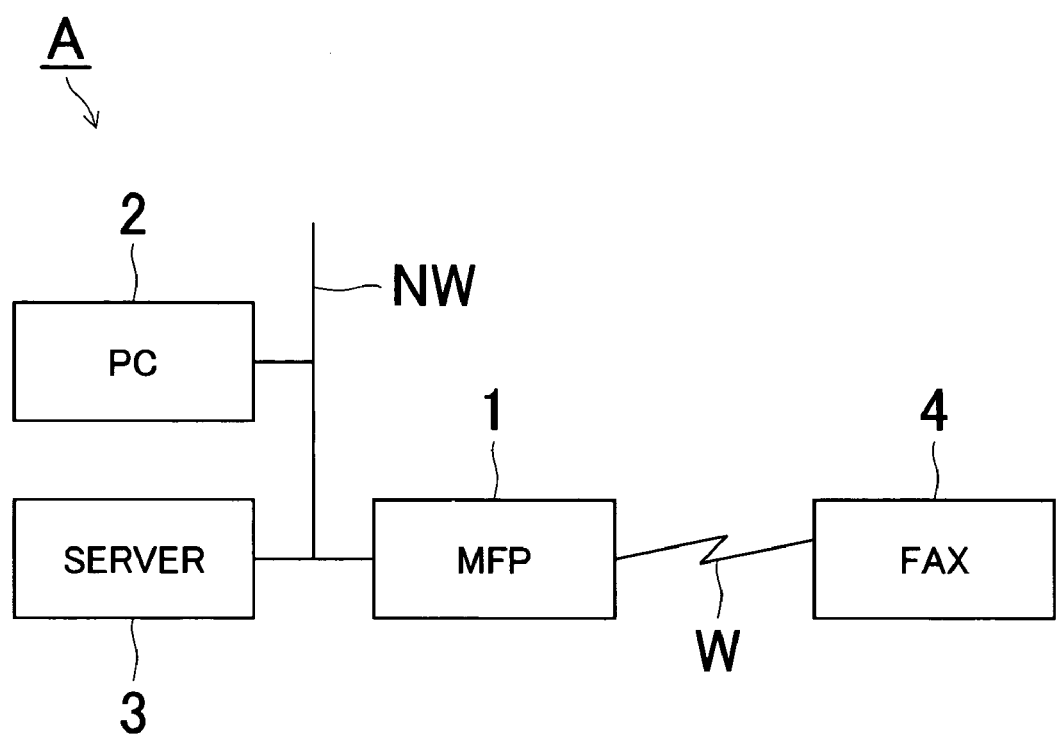
FIG. 1 is a structural view showing an image forming system to which an image forming apparatus according to an embodiment of the present invention is applied.

FIG. 1 is a structural view showing an image forming system to which an image forming apparatus according to an embodiment of the present invention is applied.

In FIG. 1, this image forming system A is provided with a MFP 1 as an image forming apparatus, a personal computer (PC) 2 as an external terminal apparatus, a server 3, and a FAX 4. The personal computer (PC) 2 and the server 3 are connected to the MFP 1 via a network NW such as a LAN. Furthermore, the FAX 4 is connected to the MFP 1 via a phone line W.

Figure 2:
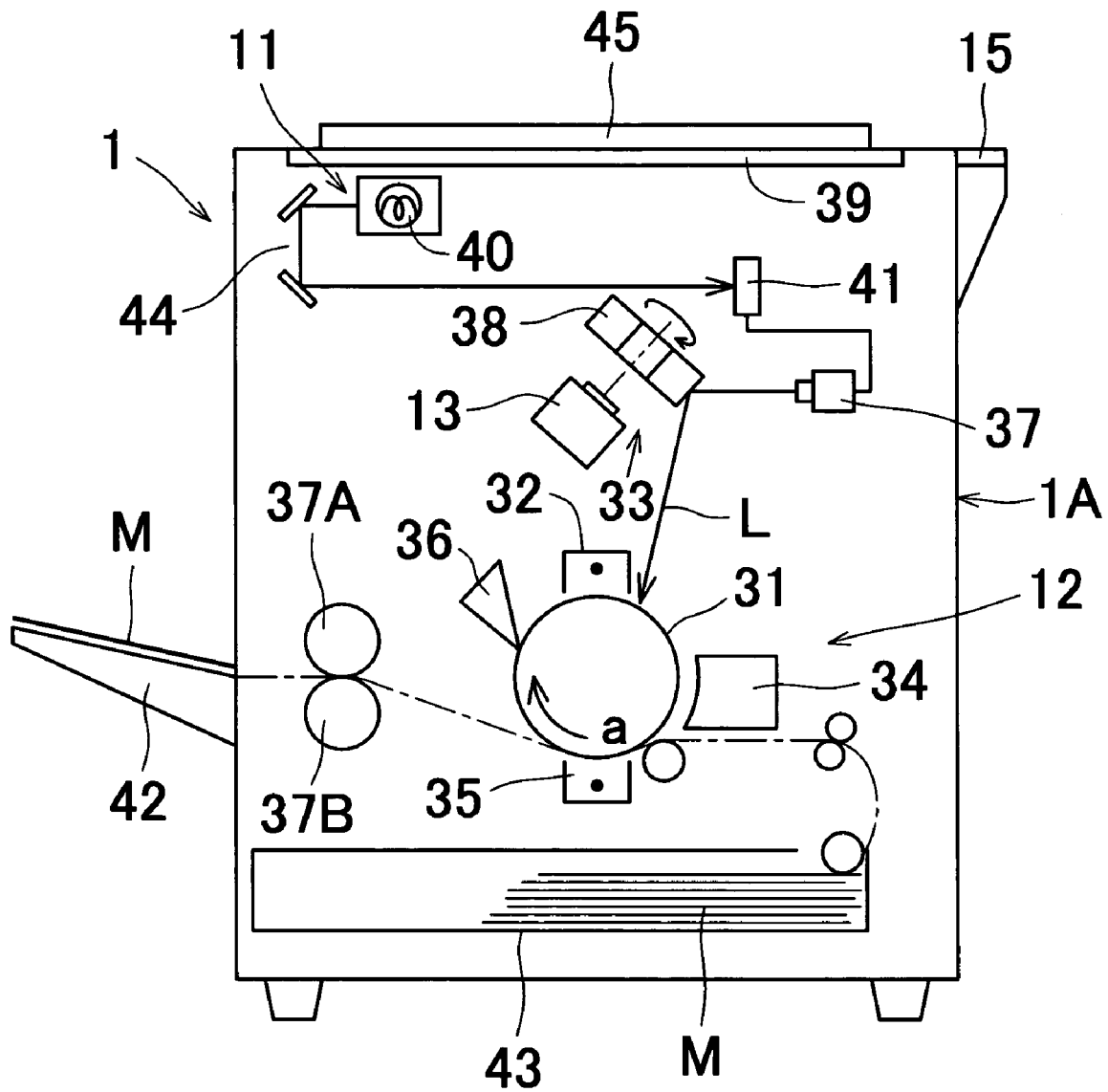
FIG. 2 is a schematic structural view showing the image forming apparatus.

FIG. 2 is a structural view showing the principal portions of the MFP 1 regarding the copy function.

As shown in FIG. 2, the main body 1A of the MFP 1 is provided with an image reading portion 11 for reading a document image at the upper portion of the main body 1A, an operation panel portion 15 at the right upper surface of the main body 1A, and a paper discharging tray 42 at the left side portion of the main body 1A. Furthermore, an image forming portion 12 is provided in the main body 1A, and a paper feeding portion 43 accommodating papers M is disposed in the inner bottom portion of the main body 1A.

The image reading portion 11 is equipped with a light source 40 for irradiating light to the image of the document placed on the document placing portion 39, a CCD 41, and an optical system 44 for guiding the reflected light from the document image toward the CCD 41. The document placing portion 39 is covered with an openable and closable document cover 45, and provided with an opening/closing operation detecting sensor 18 (see FIG. 3) for detecting the opening/closing operation of the cover 45.

The image data received by the CCD 41 is electrically converted by the CCD 41 and then subjected to necessary image processing in the image forming processing portion (not shown), and thereafter converted into a laser driving signal to be outputted to the semiconductor laser device 37 of the image forming portion 12.

The image forming portion 12 is provided with the aforementioned semiconductor laser device 37 that outputs a laser beam L corresponding to the image data, and a photosensitive drum 31 as an image carrier on which latent images are to be formed by the laser beam L. The drum 31 is configured to be rotated in a predetermined direction, e.g., in the direction shown by the arrow "a." Around the photosensitive drum 31, an electrostatic charger 32, an exposing optical system 33, a developing device 34, a transfer portion 35, and a cleaner 36 are provided. Provided at the vicinity of the paper discharging tray 42 are fixing rollers 37A and 37B for fixing the image transferred on the paper M by a well-known operation.

The optical system 33 includes a polyangular mirror, such as a polygon mirror 38, for forming an electrostatic latent image by irradiating the laser beam L from the semiconductor apparatus 37 onto the surface of the photosensitive drum 31. This polygon mirror 38 is configured to be rotatably driven by a motor 13.

Figure 3:
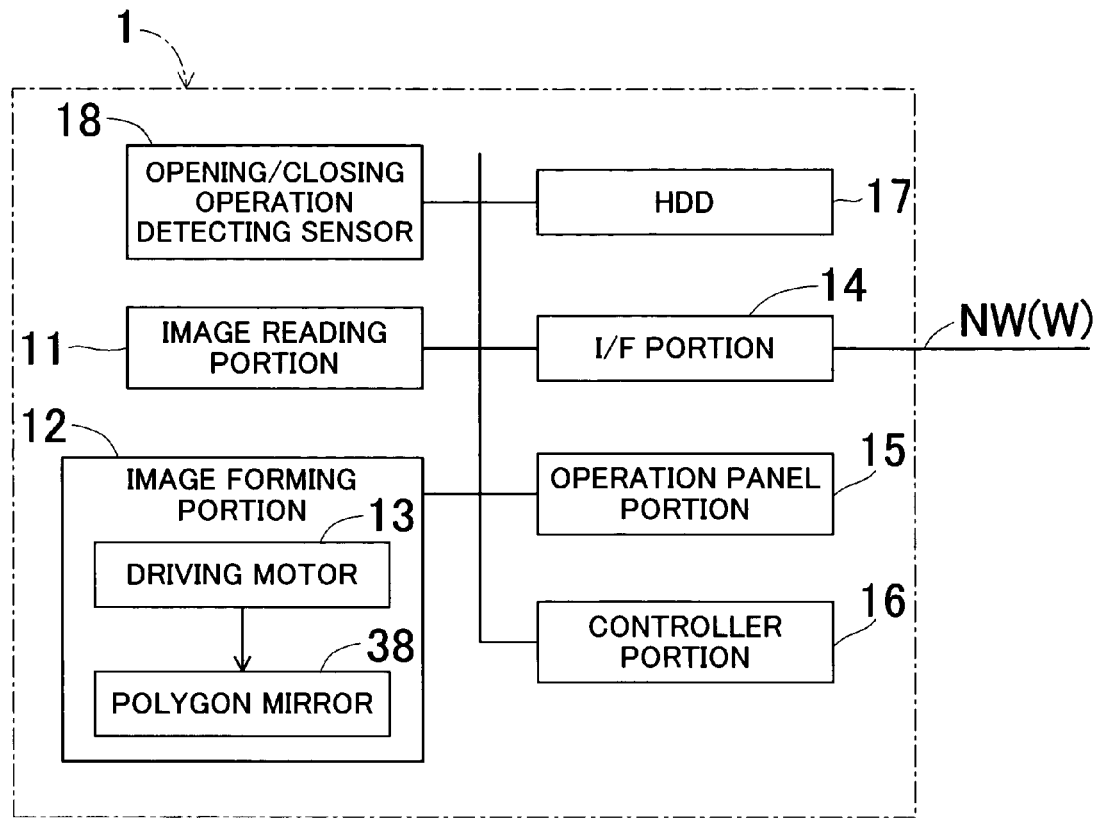
FIG. 3 is a block diagram showing an electric structure of the image forming apparatus.

FIG. 3 is a block diagram showing the electric structure of the aforementioned MFP 1.

As shown in FIG. 3, the MFP 1 is provided with the aforementioned opening/closing operation detecting sensor 18, the aforementioned image reading portion 11, the aforementioned image forming portion 12, an interface (I/F) portion 14, the aforementioned operation panel portion 15, a controller portion 16, and a hard disk device (HDD) 17.

The opening/closing operation detecting sensor 18 can be constituted by, for example, an optical type switch or a mechanical type switch.

The image reading portion 11 functions as a data input means, and reads an image of a document placed on the document placing portion 39 as mentioned above. The image forming portion 12 executes the print operation of the image data read by the image reading portion 11 or the data from the personal computer (PC) 2, the server 3 or the FAX 4 onto the paper M, and is provided with the polygon mirror 38 and its driving motor 13.

The I/F portion 14 functions as a communication means for exchanging data between the MFP 1 and the personal computer (PC) 2, the server 3 or the FAX 4. It also functions as an input means for inputting the data from the personal computer (PC) 2, the server 3 or the FAX 4. Needless to say, the personal computer (PC) 2, the server 3 and the FAX 4 are also provided with a similar I/F portion, respectively (though not shown in figures).

Figure 4:
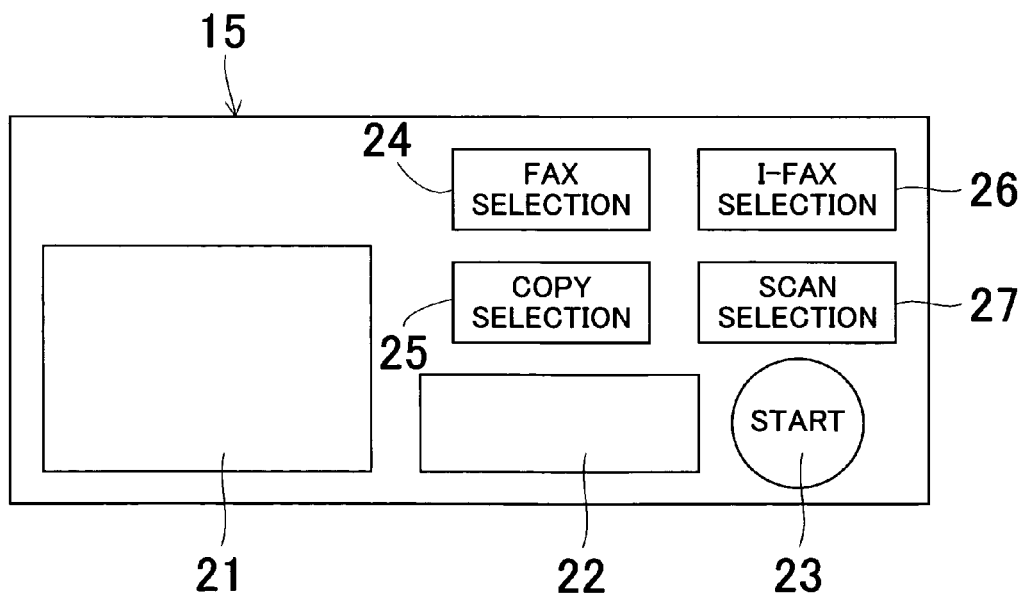
FIG. 4 is an explanatory view of an operation panel portion employed in the image forming apparatus.

As shown in FIG. 4, the operation panel portion 15 is provided with a display portion 21 such as a liquid crystal display (LCD), an operation portion 22 including various keys, a copy start button 23, a FAX selection button 24, a copy selection button 25, an Internet FAX (abbreviated as "I-FAX" in FIG. 4) selection button 26, and a scan selection button 27.

The FAX selection button 24 is a button for instructing the MFP 1 to execute the FAX transmission function of transmitting the image data read by the image reading portion 11 to the FAX 4, etc. via a phone line W. The copy selection button 25 is a button for instructing the image forming portion 12 to execute the print operation for printing the image data read by the image reading portion 11 onto a paper.

The Internet FAX selection button 26 is a button for instructing the MFP 1 to execute the Internet FAX transmission function of emailing the image data read by the image reading portion 11 to the server 3, etc. via the Internet. The scan selection button 27 is a button for instructing the MFP 1 to execute the scan function of storing the image date read by the image reading portion 11 in the HDD 17 as a storing medium.

The MFP 1 is configured to execute, other than the aforementioned functions, a print function of printing the print data received from the personal computer (PC) 2, etc., the data attached to an email read from the server 3 or the data transmitted from the FAX 4 onto a paper by the image forming portion 12.

Among these functions, the copy function and the print function are designated as a function (first function) of executing image forming (printing) by utilizing the image forming portion 12, respectively. On the other hand, the FAX transmission function, the Internet FAX transmission function and the scan function are designated as a function (second function) not utilizing the image forming portion 12, respectively, since these functions do not require the execution of image forming.

The controller portion 16 is equipped with a CPU (not shown), and totally controls the entire MFP1. In this embodiment, for example, in a state in which the MFP 1 is in a standby mode, i.e., the apparatus is in a non-working state, when the first function, such as a print function of forming an image using the image forming portion 12, is selected prior to the image forming, the motor 13 is activated so as to establish a pre-rotating state of the polygon mirror 38 for the purpose of shortening the print time. On the other hand, when the second function which does not utilize the image forming portion 12 is selected when the MFP 1 is in a standby mode, it is controlled so as not to establish the pre-rotating state of the polygon mirror 38 since no image is to be formed. This control will be detailed later.

The HDD 17 stores the image data read by the image reading portion 11 and/or another data.

Next, the contents of the pre-rotation control of the polygon mirror 38 by the controller portion 16 will be explained with reference to the flowchart shown in FIG. 5. The following explanation will be directed to the cases in which a copy function is selected as the first function of the MFP 1 and a FAX function is selected as the second function of the MFP 1. In the following explanation and figures, "Step" will be abbreviated as "S".

Figure 5:
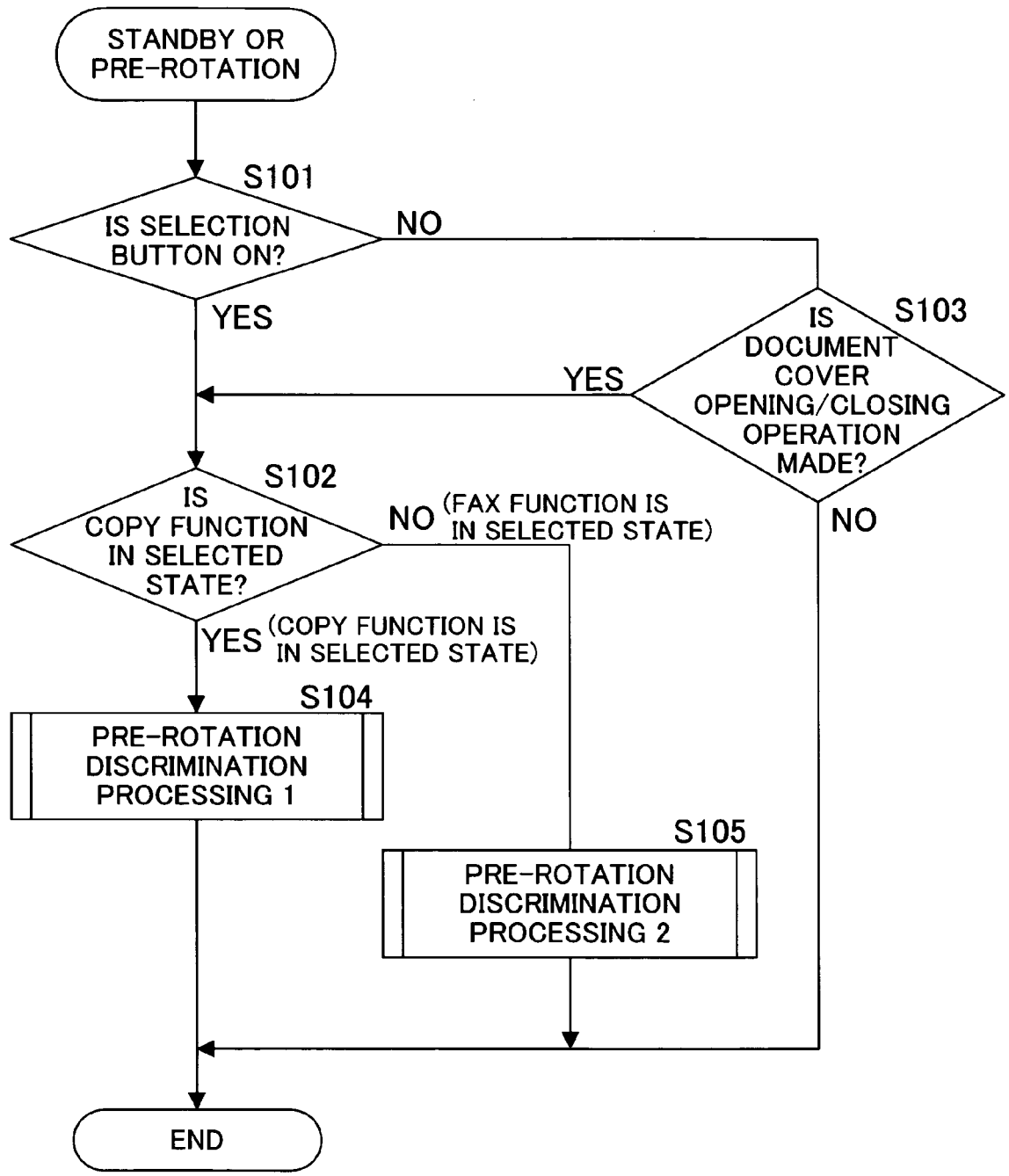
FIG. 5 is a flowchart showing the contents of a rotation control of a polygon mirror employed in the image forming apparatus.

In FIG. 5, the controller portion 16 discriminates whether one of the function switch buttons (selection buttons) 24, 25, 26 or 27 is pressed at S101 when the MFP 1 is in a standby mode or when the polygon mirror 38 is in a pre-rotating mode. If it is discriminated that one of the selection buttons 24–27 is pressed (Yes at S101), the routine proceeds to S102.

To the contrary, if it is discriminated that none of the selection buttons 24–27 is pressed (No at S101), at S103, it is discriminated whether an opening/closing operation of the document cover 45 is made, based on the signal from the opening/closing operation detecting sensor 18. If it is discriminated that an opening/closing operation of the document cover 45 is made (Yes at S103), it is discriminated that the operation of setting a document onto the document placing portion 39 is completed, and the routine proceeds to S102. If it is discriminated that no opening/closing operation of the document cover 45 is made (No at S103), the routine terminates.

At S102, it is discriminated whether the state immediately before the pressing operation of any one of the selection buttons 24–27 was the copy function selected state. If it is discriminated that it was in the copy function selected state (Yes at S102), the pre-rotation discrimination processing 1 is executed at S104, and then the routine terminates. To the contrary, if it is discriminated that it was not in the copy function selected state (i.e., in the FAX function selected state) (No at S102), the pre-rotation discrimination processing 2 is executed at S105, and then the routine terminates.

In the case where the opening/closing operation of the document cover 45 is made when the MFP 1 is in a standby mode (No at S101, and Yes at S103) in FIG. 5, for the purpose of discriminating whether the copy function is in a selected state at S102, a default which preferentially sets any one of functions in an initial state (in a standby state, i.e., in a non-working state of the apparatus) is required.

For example, in the case where a copy mode is set in the initial state, the default is a copy mode.

In this embodiment, when the opening/closing operation of the document cover 45 is detected, it is discriminated that the operation of setting a document onto the document placing portion 39 is completed as mentioned above. However, such a discrimination can be made by detecting the setting of a document by a document detecting sensor equipped to a known automatic document feeder (ADF).

Next, the contents of the subroutine of the aforementioned pre-rotation discrimination processing 1 (S104 in FIG. 5) will be explained with reference to the flowchart shown in FIG. 6.

Figure 6:
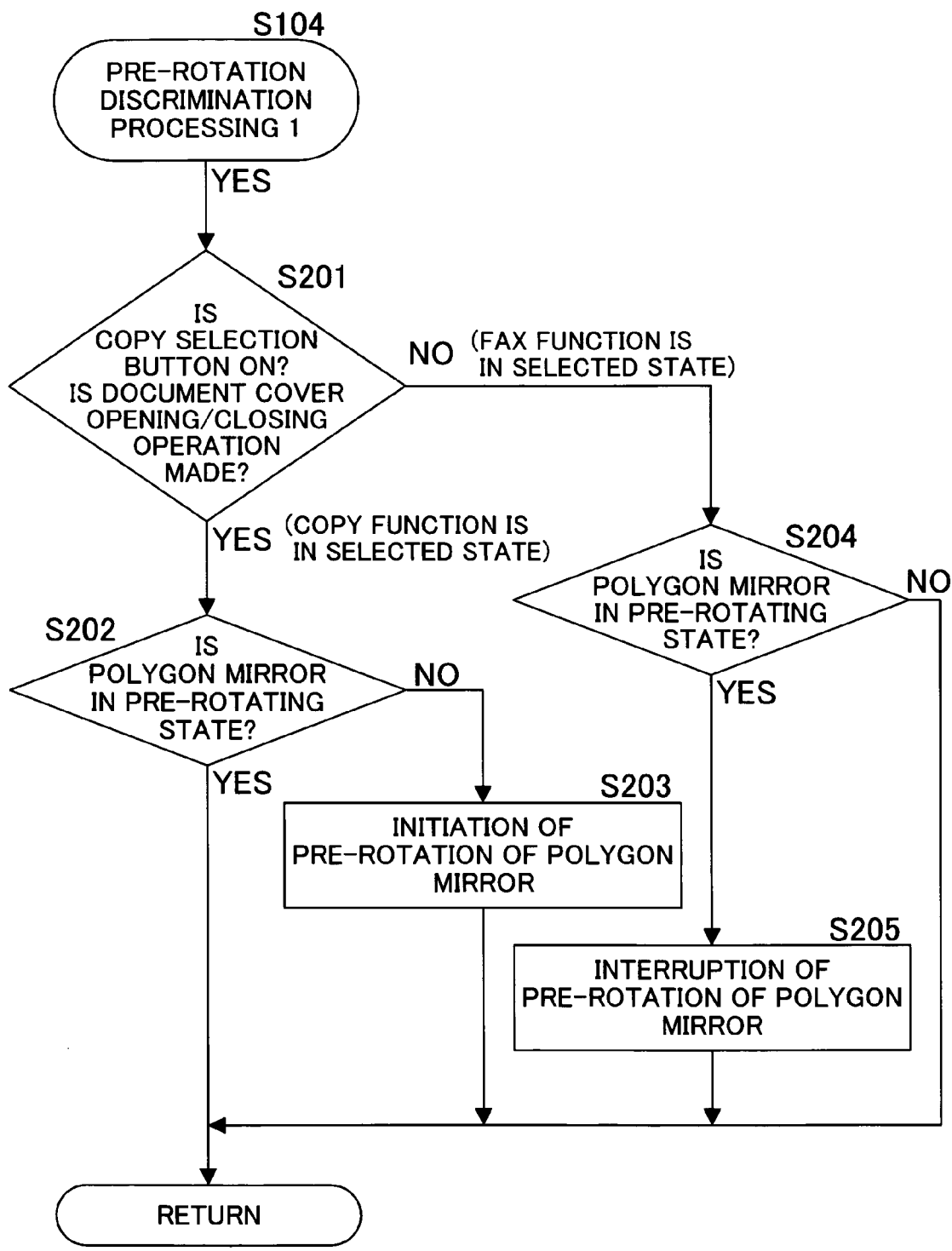
FIG. 6 is a flowchart showing a subroutine of the pre-rotation discrimination processing 1 (S104 in FIG. 5) of the polygon mirror.

In FIG. 6, at S201, it is discriminated whether the selected button 24, 25, 26 or 27 is a copy selection button 25 or whether the opening/closing operation of the document cover 45 is made.

When the copy selection button 25 is pressed or the opening/closing operation of the document cover 45 is made (Yes at S201), at S202, it is discriminated whether the polygon mirror 38 is in a pre-rotating state. If it is discriminated that the polygon mirror 38 is in a pre-rotating state (Yes at S202), the routine returns as it is. To the contrary, if it is discriminated that the polygon mirror 38 is not in a pre-rotating state (No at S202), since a function using the image forming portion 12 is selected, the pre-rotation of the polygon mirror 38 is initiated at 203, and then the routine returns. This pre-rotation enables the shortening of a time for the image forming.

On the other hand, when the pressed button is not the copy selection button 25 or the opening/closing operation of the document cover 45 is not made (No at S201), at S204, it is discriminated whether the polygon mirror 38 is in a pre-rotating state. If it is discriminated that the polygon mirror 38 is in a pre-rotating state (Yes at S204), the pre-rotation is interrupted at S205, and then the routine returns. To the contrary, if it is discriminated that the polygon mirror 38 is not in a pre-rotating state (No at S204), the routine returns as it is.

Next, the contents of the subroutine of the aforementioned pre-rotation discrimination processing 2 (S105 in FIG. 5) will be explained with reference to the flowchart shown in FIG. 7.

Figure 7:
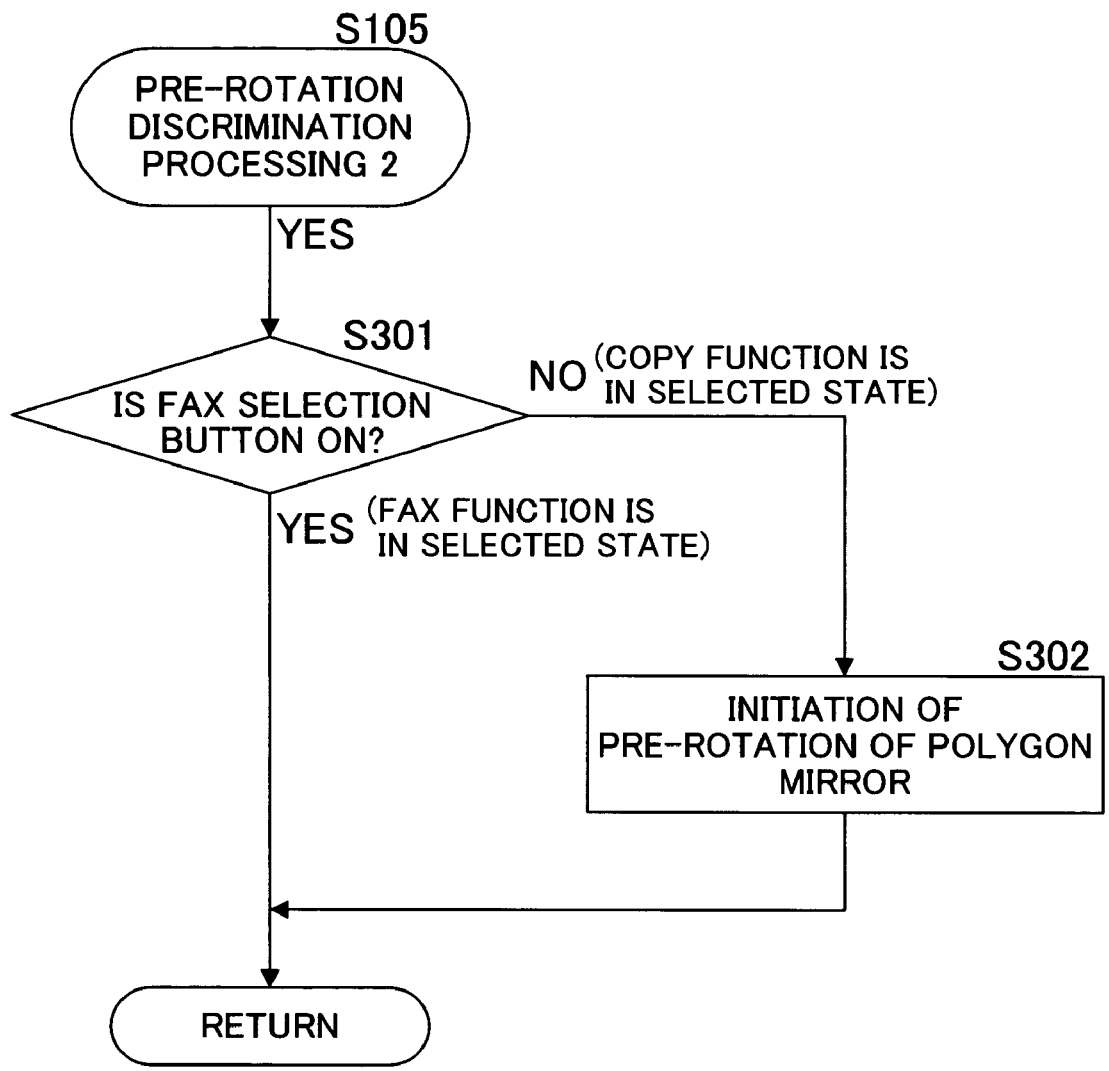
FIG. 7 is a flowchart showing a subroutine of the pre-rotation discrimination processing 2 (S105 in FIG. 5) of the polygon mirror.

In FIG. 7, at S301, it is discriminated whether the FAX selection button 24 is pressed. If it is discriminated that the FAX selection button 24 is pressed (Yes at S301), the routine returns as it is. To the contrary, if it is discriminated that the FAX selection button 24 is not pressed (No at S301), at S302, the pre-rotation of the polygon mirror 38 is initiated at 302, and then the routine returns.

For example, in the case where the copy function button 25 is pressed in a FAX function selected state, the discrimination becomes "Yes" at S101 and "No" at S102. The routine proceeds to the pre-rotation discrimination processing 2 shown as S105. Then, at S301 in FIG. 7, the discrimination becomes "No," and therefore the pre-rotation of the polygon mirror 38 is initiated at S302. Thus, the polygon mirror 38 in a non-rotating state will be brought into a pre-rotating state.

On the other hand, in the case where the opening/closing operation of the document cover 45 is made and the pressing operation of the FAX selection button 24 is made in a copy function selected state, the opening/closing operation of the document cover 45 in the copy function selected state causes the discrimination to become "No" at S101, "Yes" at S103 and "Yes" at S102 in FIG. 5. Then, the routine proceeds to the pre-rotation discrimination processing 1 shown as S104. Then, in FIG. 6, the discrimination becomes "Yes" at S201, and therefore the pre-rotation of the polygon mirror 38 is initiated via S202.

When the FAX selection button 24 is operated, the discrimination becomes "Yes" at S101 in FIG. 5, and "Yes" at S102, and therefore the routine proceeds to the pre-rotation discrimination processing 1 shown as S104. At S201 in FIG. 6, the discrimination becomes "No," and the routine proceeds to S204. At S204, the polygon mirror 38 is in a pre-rotating state and therefore the discrimination becomes "Yes." At S205, the pre-rotating state of the polygon mirror 38 is interrupted. In other words, the polygon mirror 38 in a pre-rotating state is brought into a pre-rotation prevention state when the FAX selection button is selected. This prevents a wasteful rotation of the polygon mirror 38.

In the aforementioned embodiment, although the explanation is directed to the case in which the first function is a copy function, the first function can be a print function. In this case, the discrimination of the opening/closing operation of the document cover 43 in FIGS. 5 and 6 is no longer required. In the case of the print function, when a print job is inputted or when it is discriminated by the controller portion 16 that a job is a print job, it is enough to discriminate that a print function is selected. In this case, the controller portion 16 becomes a selecting means.

Furthermore, although the aforementioned explanation is directed to the case in which the second function is a FAX transmission function, the second function can be an Internet FAX transmission function or a Scan function.

Furthermore, in the aforementioned embodiment, although the explanation is directed to the case in which the polyangular mirror is a polygon mirror 38, the polyangular mirror is not limited to a polygon mirror, but can be a galvanometer mirror or the like.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An image forming apparatus, comprising:
   an input portion to input data;
   an image forming portion configured to form a latent image on an image carrying member by irradiating a laser beam corresponding to the data inputted via the input portion onto a reflecting member rotatably driven by a motor and irradiating light reflected by the reflecting member onto the image carrying member, and also configured to enable a pre-rotation of the reflecting member by driving the motor prior to irradiation of the laser beam; and a control portion configured to initiate a pre-rotation of the reflecting member when a first apparatus function which uses the image forming portion for the data inputted from the input portion is selected, and configured to prohibit the pre-rotation of the reflecting member when a second apparatus function to store the data inputted from the input portion in a storing medium or to transmit the data to an external terminal apparatus without using the image forming portion is selected.

2. The image forming apparatus as recited in claim 1, wherein the input portion is an image reading portion configured to read a document, wherein the first function is a copy function to copy image data read by the image reading portion, and wherein the second function is a scan function to store the image data read by the image reading portion in the storing medium or a facsimile transmission function configured to transmit the image data read by the image reading portion to the external terminal apparatus.

3. The image forming apparatus as recited in claim 1, wherein the input portion is a communication portion configure to exchange data between the image forming apparatus and the external terminal apparatus, and wherein the first function is a print function to print image data received by the communication portion.

4. The image forming apparatus as recited in claim 1, further comprising a plurality of selection buttons provided at an operation panel portion, the selection buttons including a copy selection button for selecting a copy function, a scan selection button for selecting a scan function and a facsimile selection button for selecting a facsimile transmission function, wherein at least one of the selection buttons is configured to select the first function, and at least one selection button is configured to select the second function.

5. The image forming apparatus as recited in claim 1, wherein the reflecting member is a polygon mirror.

6. The image forming apparatus as recited in claim 1, wherein the reflecting member is a galvanometer mirror.

7. An image forming apparatus, comprising:

an input portion to input data;

an image forming portion configured to form a latent image on an image carrying member by irradiating a laser beam corresponding to the data inputted via the input portion onto a reflecting member rotatably driven by a motor and irradiating light reflected by the reflecting member onto the image carrying member, and also configured to enable a pre-rotation of the reflecting member by driving the motor prior to irradiation of the laser beam; and a control portion configured to initiate a pre-rotation of the reflecting member when a first apparatus function which uses the image forming portion for the data inputted from the input portion is selected, and configured to prohibit the pre-rotation of the reflecting member when a second apparatus function to store the data inputted from the input portion in a storing medium or to transmit the data to an external terminal apparatus without using the image forming portion is selected, wherein the input portion is an image reading portion configured to read a document placed on a document placing portion, and wherein the control portion is configured to cause the pre-rotation of the reflecting member when a document is placed on a document placing portion of the image reading portion, to maintain the pre-rotation of the reflecting member when the first function is selected, and to stop the pre-rotation of the reflecting member when the second function is selected.

8. An image forming method to be executed by an image forming apparatus comprising an input portion configured to input data, and an image forming portion configured to form a latent image on an image carrying member by irradiating a laser beam corresponding to the data inputted via the input portion onto a reflecting member rotatably driven by a motor and irradiating light reflected by the reflecting member onto the image carrying member, and configured to enable a pre-rotation of the reflecting member by driving the motor prior to irradiation of the laser beam, the method comprising:

inputting the data via the input portion;

causing a pre-rotation of the reflecting member prior to forming the latent image by irradiating light reflected by the reflecting member when a first function to form the latent image by irradiating the laser beam corresponding to the data inputted from the input portion onto the reflecting member rotatably driven by the motor and irradiating light reflected by the reflecting member onto the image carrying member is selected, and prohibiting the pre-rotation of the reflecting member when a second function to store the data inputted from the input portion in a storing medium or to transmit the data to an external terminal apparatus without using the image forming portion is selected.

9. The image forming method as recited in claim 8, wherein the input portion is an image reading portion to read a document, wherein the first function is a copy function to copy image data read by the image reading portion, and wherein the second function is a scan function to store the image data read by the image reading portion in the storing medium or a facsimile transmission function to transmit the image data read by the image reading portion to the external terminal apparatus.

10. The image forming method as recited in claim 8, wherein the input portion is a communication portion to exchange data between the image forming apparatus and the external terminal apparatus, and wherein the first function is a print function to print image data received by the communication portion.

11. The image forming method as recited in claim 8, further comprising:

selecting the first function or the second function by an operation of one of a plurality of selection buttons provided at an operation panel portion, the plurality of selection buttons comprising a copy selection button to select a copy function, a scan selection button to select a scan function and a facsimile selection button to select a facsimile transmission function.

* * * * *